United States Patent [19]

Harvell et al.

[11] Patent Number: 4,860,546

[45] Date of Patent: Aug. 29, 1989

[54] VACUUM SYSTEM WITH MOLECULAR FLOW LINE

[75] Inventors: John T. Harvell, Subduby; Philip A. Lessard, Boxborough, both of Mass.

[73] Assignee: Helix Technology Corporation, Waltham, Mass.

[21] Appl. No.: 230,573

[22] Filed: Aug. 10, 1988

[51] Int. Cl.[4] .............................................. B01D 8/00
[52] U.S. Cl. ........................................ 62/55.5; 62/100; 62/268; 55/269; 417/901
[58] Field of Search ................... 62/55.5, 100, 268; 55/269; 417/901

[56] References Cited

U.S. PATENT DOCUMENTS

| | | | |
|---|---|---|---|
| 3,485,054 | 12/1969 | Hogan | 62/55.5 |
| 3,536,418 | 10/1970 | Breaux | 62/55.5 |
| 4,446,702 | 5/1984 | Peterson et al. | 62/55.5 |
| 4,464,905 | 8/1984 | Dittrich et al. | 62/55.5 |
| 4,479,927 | 10/1984 | Gelernt | 62/55.5 |
| 4,488,507 | 12/1984 | Heinecke et al. | 62/55.5 |
| 4,577,465 | 3/1986 | Olsen et al. | 62/55.5 |

*Primary Examiner*—Ronald C. Capossela

*Attorney, Agent, or Firm*—Hamilton, Brook, Smith & Reynolds

[57] ABSTRACT

In a vacuum system having a load lock cooperating with a work chamber, a flow line is connected between the cryopump of the load lock and the work chamber. The flow line passes noncondensible gases which are not absorbed by the cryopump of the load lock to the work chamber 12 for absorption by the cryopump of the work chamber. Alternatively, the flow line is connected between the load lock cryopump and the cryopump of the work chamber for directly passing the noncondensible gases to the work chamber cryopump. The flow line prevents buildup of noncondensible gases within the cryopump of the load lock. The flow line may include baffles to damp pressure surges during cryopumping of the load lock. A control valve connected to the flow line allows operator control of the passing of noncondensible gases from the load lock cryopump to the work chamber or to the work chamber cryopump through the flow line. The dimensions of the flow line provide molecular flow of the noncondensible gases.

22 Claims, 2 Drawing Sheets

VACUUM SYSTEM WITH MOLECULAR FLOW LINE

BACKGROUND OF THE INVENTION

Cryopumps are frequently used to remove gases from work environments and maintain them at high vacuum. Many processes require a near perfect vacuum for good results. Further, best process results and manufacturing efficiencies are often achieved where a vacuum is continuously maintained in the work space. In this way, uniform and repeatable processes may be performed without interruption. Recently, the increasing miniaturization of electronic components manufactured in vacuum has increased the sensitivity of those components to minute amounts of contaminants.

Vacuum manufacturing working environment base pressures before processing are typically below $5 \times 10^{-5}$ torr. In most manufacturing operations, however, it is necessary to transfer materials into and out of the high vacuum work space. Conventionally, this may be done in two manners. The simplest method is to place the work material into the vacuum work chamber at atmospheric conditions. The vacuum work chamber is then evacuated prior to manufacturing. This period of evacuation is often lengthy and does not always achieve optimum conditions in the work chamber. An alternative to this approach is to utilize a vacuum load lock adjacent to the vacuum work chamber. The load lock is used to move material into and out of the work chamber while maintaining the work chamber at a high vacuum. In such a system raw material is placed in the load lock at ambient conditions after which the load lock is evacuated to an intermediate crossover pressure by a roughing pump. The load lock is then further evacuated to a high vacuum state by a small high vacuum pump, such as a cryopump. After the load lock space has been fully evacuated, it is opened to the work chamber and the raw material is transferred into the work chamber. Finished processed material is removed either through the same load lock or through a separate exit load lock in a "pass through" type system.

In typical applications of such a load lock assembly in a high vacuum system, the associated cryopump and load lock are subject to severe duty cycles. For example, a 40 cc volume load lock is cycled from 1 atmosphere to 1 torr every 3.6 seconds by the cryopump in a high throughput application. With such a high gas load on the cryopump, the operating temperature of the cryopump may potentially rise above 20° Kelvin. Above 20° Kelvin, the capacity of the cryopump's charcoal adsorbent for the three noncondensible gases, $H_2$, Ne and He, is significantly reduced. If the charcoal is near a saturated condition, then previously adsorbed noncondensing gases are released from the cryopump's charcoal adsorbant as the charcoal warms up. Consequently, the noncondensible gases build up in the cryopump and prevent a high vacuum from being achieved in the load lock.

Accordingly, there is a need to prevent the build up of the three noncondensible gases in the load lock cryopump under such heavy gas loads in high throughput applications.

SUMMARY OF THE INVENTION

The present invention provides a vacuum system and a method of operation which permits the main work chamber high vacuum pump to pump away unadsorbed noncondensible gases from the load lock cryopump. The vacuum system comprises a work chamber and a load lock for receiving material to be introduced to and removed from the work chamber. The load lock is in fluid communication with a first high vacuum pump (i.e. an associated cryopump). The work chamber is in fluid communication with a second high vacuum pump. A flow line is positioned between the first high vacuum pump and the work chamber and passes noncondensible gases in the first high vacuum pump to the work chamber. The noncondensible gases are thereafter pumped away by the second high vacuum pump of the work chamber.

In a preferred embodiment of the vacuum system, the flow line maintains a molecular flow of the noncondensible gases, as opposed to a viscous flow, from the first high vacuum pump to the work chamber. The flow line includes a low conductance pipe and a valve for enabling and disabling the passage of noncondensible gases at operator desired times. Further, a baffle arrangement is positioned at the end of the flow line associated with the first high vacuum pump. The baffle arrangement dampens pressure surges during operation of the first high vacuum pump and assures transmission in the molecular flow regime.

In an alternative design, the flowline is positioned between the first high vacuum pump and the second high vacuum pump to directly pass noncondensible gases from the first high vacuum pump to the second high vacuum pump for subsequent adsorption therein.

In a third configuration, the noncondensible gases in the first high vacuum pump are passed through the load lock to the work chamber by a valve controlling scheme which opens at the same time the isolation valve between the load lock and the first high vacuum pump and the transfer valve between the load lock and the work chamber. The accumulation of the noncondensible gases is quickly removed from the first high vacuum pump by the second high vacuum pump.

BRIEF DESCRIPTION OF THE DRAWING

The foregoing and other objects, features and advantages of the invention will be apparent from the following more particular description of illustrative embodiments of the invention, as illustrated in the accompanying drawings in which like referenced characters refer to the same parts throughout the different views. The drawings are not necessarily to scale, emphasis instead being placed upon illustrating principles of the invention.

DETAILED DESCRIPTION OF THE PREFERRED EMBODIMENTS

Figure 1:
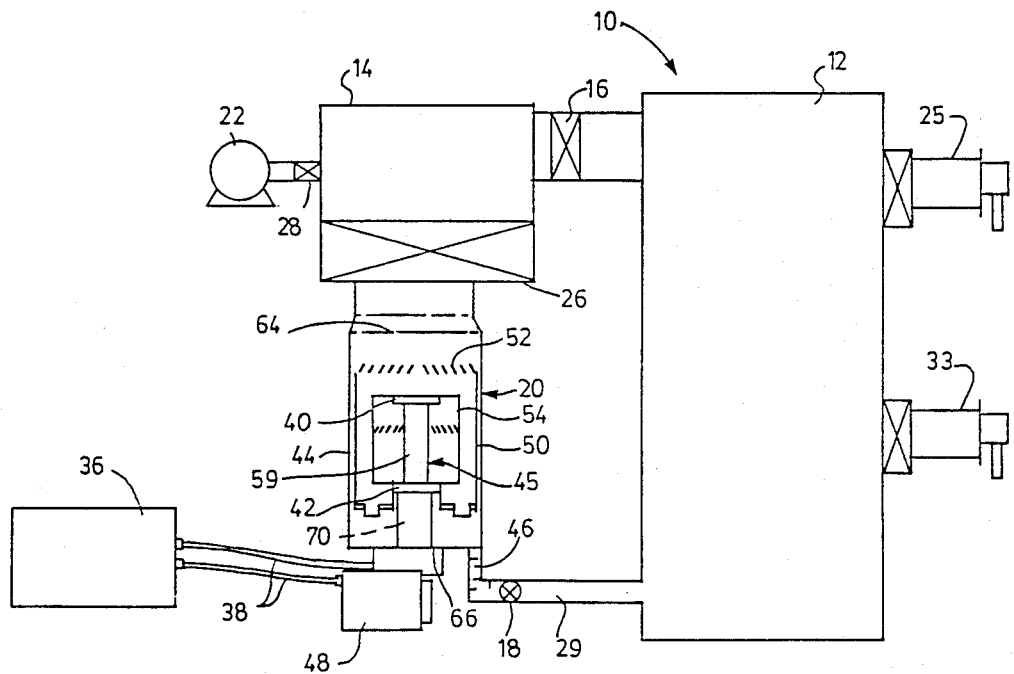
FIG. 1 is a schematic representation of a high vacuum system incorporating the present invention.

FIG. 1 illustrates a high vacuum system 10 incorporating the present invention. The system 10 includes a work chamber 12 which provides a high vacuum environment in which subject material is processed, and a load lock 14 for transferring the subject material to and from the work chamber 12. The work chamber 12 and load lock 14 are maintained at a high vacuum by respective pumping means, such as roughing pump 22 and cryopumps 25, 33 and 20 respectively.

When the system 10 is initially started, the work chamber 12 is brought to an intermediate vacuum pressure by a roughing pump (not shown). After the work chamber 12 has been evacuated to a moderate vacuum pressure, the roughing pump is isolated from the work chamber 12. The main chamber cryopumps 25 and 33 are then activated and draw down the pressure of the work chamber 12 to a very high base vacuum. Subsequent to drawing down the work chamber pressure, the main chamber cryopumps 25 and 33 either maintain the work chamber 12 at a high vacuum of below about $10^{-5}$ torr or pump process gases used in certain processing to pressures of about $10^{-1}$ torr.

Process material is brought into and out of the work chamber 12 through the load lock 14. The load lock 14 is first emptied of previously processed material and loaded with subject material to be processed. The load lock is then pumped to a rough vacuum by mechanical pump 22. When the pressure level in the load lock 14 reaches a moderate crossover vacuum of about $2 \times 10^{-1}$ to about $3 \times 10^{-1}$ torr by pump 22, the mechanical pump 22 is isolated from the system by the closing of valve 28. Gate valve 26 is then opened to allow the load lock cryopump 20 to evacuate load lock 14 to a high vacuum state below about $10^{-5}$ torr. After a high vacuum state of below about $10^{-5}$ torr is achieved in the load lock 14 by cryopump 20, valve 26 is closed and valve 16 is opened. The process material is then transported from the load lock 14 to work chamber 12. Any previously processed material presently in work chamber 12 is transferred to load lock 14 for removal from the system.

The load lock cryopump 20 comprises a main housing 44 which is mounted to gate valve 26. A front opening 64 in the cryopump in the main housing 44 communicates with the load lock 14 through the gate valve 26. The load lock cryopump 20 is preferably cooled by a two stage refrigerator of the regenerator-displacer type. In this case, the refrigerator is a Gifford-McMahon refrigerator but others may be used. The refrigerator includes a two stage cold finger 45 which protrudes into the housing 44 through an opening 66. A displacer in the cold finger 45 is driven by motor 48. Helium gas is introduced and removed from the cold finger 45 by lines 38 from compressor 36. Helium gas entering the cold finger 45 is expanded by the displacer and thus cooled in a manner which produces the desired very cold temperatures.

A first stage pumping surface 52 is mounted in the cold end of a heat sink 42 of the first stage 70 of the refrigerator through a radiation shield 50. Similarly, a second stage array 54 is mounted to the heat sink 40 of the second stage 59 of the refrigerator. The second stage 59 of the cold finger extends through an opening at the base of the radiation shield 50.

The second stage pumping surface 54 which is mounted to heat sink 40 operates at a temperature of about 15° Kelvin. The second stage pumping surface 54 comprises a set of chevrons arranged in an appropriate array. The surfaces of the chevrons making up the pumping array may hold a low temperature adsorbant or a cryosorbant charcoal. Access to this adsorbant by low boiling point gases such as hydrogen, neon and helium results in the adsorption of these gases and therefore their removal from the environment.

The radiation shield 50 mounted to the first stage heat sink 42 operates at about 77° Kelvin. The radiation shield 50 surrounds the lower temperature second stage cryopumping area 54 and minimizes the heating of that area by freezing higher boiling point vapors in the environment such as water vapors, by precooling condensible gases such as nitrogen, oxygen, argon, etc. about the first stage pumping surface 52, and by intercepting the thermal radiant energy load from the ambient temperature main housing 44 of the cryopump 20.

The front cryopanel 52 serves as both a radiation shield for the second stage pumping area 54 and as a cryopumping surface for higher boiling point temperature gases such as water vapor. This panel comprises an array of circular concentric louvers and chevrons. The array may be designed of other configurations but it should be an array of baffles so arranged as to act as a radiant heat shield and higher temperature cyropumping surface while providing a path for lower boiling point temperature gases to be admitted to the second stage pumping area to be cryosorbed. In particular, the array minimizes the heating of the second stage cryopumping area 54 by freezing higher boiling point vapors, by precooling condensible gases in the environment, and by intercepting thermal radiant energy from ambient temperature main housing 44.

Cryopump 20 of FIG. 1 departs from conventional design in that it allows for passage, or more accurately stated, leakage of noncondensible gases which are not cryosorbed by the second stage pumping area 54 through conduit 29. As a result, in applications where material is transferred by the load lock 14 to and from the working chamber 12 at a rate, for example, of about one thousand times per hour and the second stage 54 of the cryopump 20 is unable to cool to the cryosorbing temperature of the low boiling point gases of about 15° Kelvin, the conduit 29 allows the unadsorbed, noncondensible gases (i.e. $H_2$, Ne and He) to be passed from cyropump 20 to the working chamber 12. In working chamber 12, the noncondensible gases are subsequently cryopumped by the main chamber cryopumps 25 and 33. In this manner, conduit 29 prevents the build up of noncondensible gases within cyropump 20.

It is understood that cryopumps 25 and 33 may be any high vacuum type pump and are not limited to cryopumps.

The conduit 29 from cryopump 22 to work chamber 12 is of vacuum quality material such as stainless steel or copper tubing and of surface finishes suitable for high vacuum operation.

Since conduit 29 is open at both the load lock cryopump 20 end and the work chamber 12 end, conduit 29 allows for a two way flow of gases between cryopump 20 and work chamber 12. However, the noncondensible gases flowing from the cryopump 20 into the work chamber 12 are generally of lighter mass than the gases in work chamber 12 and therefore flow at a faster rate than the rate at which the gases within work chamber 12 flow into cryopump 20 through conduit 29. In addition, gases flowing from the work chamber 12 to cryopump 20 are generally of boiling point temperatures which cryopump 20 can readily freeze and absorb. Thus, the two way flow of conduit 29 does not pose any substantial disadvantage on cryopump 20.

On the other hand, the heat load placed on cryopump 20 in freezing and absorbing the gases flowing from the work chamber 12 is a function of the number of gas molecules per unit time flowing from the work chamber 12 to cryopump 20. Accordingly, a molecular flow, as opposed to a viscous flow, of gases from work chamber 12 to cryopump 20 is required. "Molecular flow" is defined to exist when the average distance a gas molecule travels before colliding with another molecule is greater than the distance the molecule travels before colliding with a wall of the system through which it travels. Thus, the smaller the diameter and passages of conduit 29 through which the gas flows, the greater is the possibility of obtaining a molecular flow of the gases from work chamber 12 to cryopump 20. In addition, at the low operating pressures of the high vacuum system 10, the molecules of the noncondensible gases are relatively far apart from each other. Hence, in order to achieve molecular flow of the noncondensible gases within conduit 29, an inner diameter of less than about 10 mm within conduit tube 29 is provided. In light of this dimension and design, it can be said that the conduit 29 is a molecular flow gate or a low conductance pipe.

Further, the total amount of the noncondensible gases ($H_2$, Ne and He) in a normal atmosphere is less than ten parts per million, i.e. a very small concentration. Therefore the small pumping speed of the molecular flow gate 29 is all that is required to maintain a low pressure of these three noncondensible gases in cryopump 20.

A valve 18 may be used to close conduit 29 during the cryopumping of load lock 14 so as to prevent any instantaneous peak pressure load from flowing to the work chamber 12. Valve 18 is of the type which is suitable for high vacuum use and is user adjustable to enable or disable the flow of the gases through conduit 29 between cryopump 20 and work chamber 12.

Baffles 46 may be provided within the cryopump end of conduit 29 to provide extra walls or surface area. The added surface area decreases the size of the passage through which the gases flow in conduit 29 and thus aid in the maintaining of molecular flow. In addition, baffles 46 damp pressure surges during the cryopumping of load lock 14.

A system 10 incorporating the two-way molecular flow gate 29 operates as follows. Process material is loaded into and taken out of load lock 14. Load lock 14 is rough pumped by mechanical pump 22 to an intermediate vacuum state. Once the pressure level in the load lock 14 reaches a rough vacuum stage, valve 28 is closed and gate valve 26 is opened. Control valve 18 of molecular flow gate 29 is also closed to prevent peak pressure loads during cryopumping of load lock 14 from being passed to work chamber 12. Cryopump 20 then pumps load lock 14 to a high vacuum state. Once the high vacuum state is reached gate valve 26 is closed and control valve 18 of conduit 29 is opened to allow unadsorbed noncondensible gases to flow from load lock cryopump 20 to work chamber 12. Valve 16 is opened and material is transported to and from the load lock 14 to work chamber 12. Valve 16 is closed and work chamber 12 is cryopumped to a high vacuum by cryopump 33 which adsorbs the noncondensible gases passed from cryopump 20 to work chamber 12 through conduit 29. The cycle is then repeated for the processing of further material.

It is understood that other pumping systems maybe used in place of a rough pump and cryopumps 25, 33 for work chamber 12 as long as noncondensible gases are trapped or removed from work chamber 12. Similarly, a high vacuum pump without an intermediate mechanical pump such as pump 22 may be used to achieve a high vacuum in load lock 14.

Figure 2:
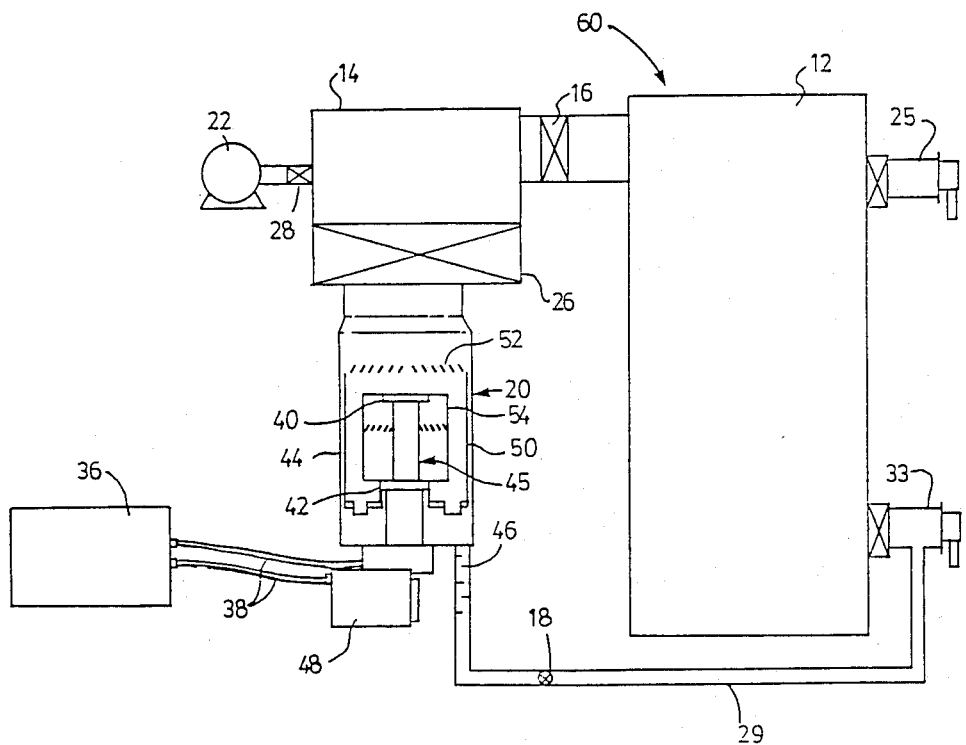
FIG. 2 is a schematic representation of another high vacuum system incorporating the present invention.

Alternatively, the conduit 29 may be connected to main chamber cryopump 33 as shown in FIG. 2. In this case, the unadsorbed, noncondensible gases are passed from load lock cryopump 20 directly to main chamber cryopump 33 for adsorption there. An added advantage with this design is that the work chamber 12 is not exposed to the noncondensible gases which are being passed. In all other respects, high vacuum system 60 shown in FIG. 2 works in the same manner as high vacuum system 10 of FIG. 1 described above.

In either high vacuum system 10 (FIG. 1) or high vacuum system 60 (FIG. 2), the three noncondensible gases in the load lock cryopump 20 may be passed through the load lock 14 itself to the work chamber 12 for adsorption by main chamber cryopumps 25 and 33. This is accomplished by a valve control scheme, which opens at the same time, the gate valve 26 and the valve 16 between the load lock 14 and work chamber 12, while the control valve 18 of the molecular flow gate 29 is closed. During the time in which the valves 26 and 16 are simultaneously open and the control valve 18 is closed, the accumulation of the noncondensible gases is quickly removed from the load lock cryopump 20 by the main chamber pumps 25 and 33. To resume operation of the high vacuum system for processing, the valves 16, 26 are closed and the above described processing cycle is begun anew.

As an example of the use of the foregoing valve control scheme, the two valves 16, 26 may be opened for 10 seconds out of each hour to keep up with the continuous buildup of the noncondensible gases from an atmospheric pressure pump down. Conventional means for controlling the valves 26, 16 in accordance with the valve control scheme are suitable.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. A vacuum system comprising:
    a work chamber;
    a load lock for receiving material to be introduced into and removed from the work chamber;
    a first high vacuum pump for fluid communication with the load lock;
    a second high vacuum pump for fluid communication with the work chamber; and
    a flow line from the first high vacuum pump to the work chamber for allowing noncondensible gases in the first high vacuum pump to be passed to the work chamber and subsequently pumped away by the second high vacuum pump.

2. A vacuum system as claimed in claim 1 wherein the flow line maintains molecular flow of the noncondensible gases from the first high vacuum pump to the work chamber.

3. A vacuum system as claimed in claim 1 wherein the flow line includes a low conductance pipe.

4. A vacuum system as claimed in claim 1 wherein the flow line includes a valve for enabling and disabling noncondensible gases to pass.

5. A vacuum system as claimed in claim 1 wherein the flow line includes a baffle arrangement at an end of the flow line associated with the first high vacuum pump, the baffle arrangement for damping pressure surges during operation of the first high vacuum pump on the load lock.

6. A vacuum system as claimed in claim 1 wherein the noncondensible gases include helium.

7. A method of continuously processing material in a high vacuum system comprising the steps of:
- placing said material in a load lock;
- reducing the load lock pressure to a crossover pressure by means of a first high vacuum pump;
- reducing the pressure in a work chamber by means of a second high vacuum pump;
- passing noncondensible gases through a flow line from the first high vacuum pump to the work chamber for subsequent pumping by the second high vacuum pump;
- connecting the load lock to the work chamber; and
- transferring the material from the load lock into the work chamber.

8. A method as claimed in claim 7 wherein the step of passing noncondensible gases through a flow line includes maintaining a molecular flow of the noncondensible gases in the flow line from the first high vacuum pump to the work chamber.

9. A method as claimed in claim 7 wherein the step of passing noncondensible gases through a flow line is accomplished at user desired times by opening and closing a valve connected to the flow line.

10. A method as claimed in claim 7 further comprising the step of damping pressure surges during operation of the first high vacuum pump with baffles in the flow line.

11. A vacuum system comprising:
- a work chamber;
- a load lock for receiving material to be introduced into and removed from the work chamber;
- a first high vacuum pump for fluid communication with the load lock;
- a second high vacuum pump for fluid communication with the work chamber; and
- a flow line from the first high vacuum pump to the second high vacuum pump for allowing noncondensible gases from the first high vacuum pump to be passed to the second high vacuum pump and subsequently pumped away by the second high vacuum pump.

12. A vacuum system as claimed in claim 11 wherein the flow line maintains molecular flow of the noncondensible gases from the first high vacuum pump to the second high vacuum pump.

13. A vacuum system as claimed in claim 11 wherein the flow line includes a low conductance pipe.

14. A vacuum system as claimed in claim 11 wherein the flow line includes a valve for enabling and disabling noncondensible gases to pass.

15. A vacuum system as claimed in claim 11 wherein the flow line includes a baffle arrangement at an end of the flow line associated with the first high vacuum pump, the baffle arrangement for damping pressure surges during operation of the first high vacuum pump on the load lock.

16. A vacuum system as claimed in claim 11 wherein the noncondensible gases include helium.

17. A method of continuously processing material in a high vacuum system comprising the steps of:
- placing said material in a load lock;
- reducing the load lock pressure to a crossover pressure by means of a first high vacuum pump;
- reducing the pressure in a work chamber by means of a second high vacuum pump;
- passing noncondensible gases through a flow line from the first high vacuum pump to the second high vacuum pump for subsequent pumping by the second high vacuum pump;
- connecting the load lock to the work chamber; and
- transferring the material from the load lock into the work chamber.

18. A method as claimed in claim 17 wherein the step of passing noncondensible gases through a flow line includes maintaining a molecular flow of the noncondensible gases in the flow line from the first high vacuum pump to the second high vacuum pump.

19. A method as claimed in claim 17 wherein the step of passing noncondensible gases through a flow line is accomplished at user desired times by opening and closing a valve connected to the flow line.

20. A method as claimed in claim 17 further comprising the step of damping pressure surges during operation of the first high vacuum pump with baffles positioned in the flow line.

21. A vacuum system comprising:
- a work chamber;
- a load lock for receiving material to be introduced into and removed from the work chamber;
- a first high vacuum pump for fluid communication with the load lock;
- a second high vacuum pump for fluid communication with the work chamber; and
- valving means coupling the first high vacuum pump, load lock and work chamber for allowing noncondensible gases in the first high vacuum pump to be passed through the load lock to the work chamber and subsequently pumped away by the second high vacuum pump.

22. A method of minimizing accumulation of noncondensible gases in a high vacuum system comprising the steps of:
- simultaneously providing fluid communication between a load lock and work chamber and between the load lock and a first high vacuum pump associated with the load lock;
- allowing noncondensible gases to flow from the first high vacuum pump, through the load lock to the work chamber; and
- pumping the noncondensible gases out of the work chamber by means of a second high vacuum pump.

* * * * *